(12) United States Patent
Miyauchi et al.

(10) Patent No.: US 7,116,913 B2
(45) Date of Patent: Oct. 3, 2006

(54) OPTICAL TRANSMISSION SYSTEM AND DISPERSION COMPENSATOR

(75) Inventors: Akira Miyauchi, Kawasaki (JP); Kazuo Yamane, Kawasaki (JP); Yumiko Kawasaki, Kawasaki (JP); Satoru Okano, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/958,277

(22) Filed: Oct. 6, 2004

(65) Prior Publication Data

US 2005/0047792 A1 Mar. 3, 2005

Related U.S. Application Data

(60) Division of application No. 09/749,774, filed on Dec. 28, 2000, now Pat. No. 6,823,141, which is a continuation of application No. 08/922,677, filed on Sep. 3, 1997, now abandoned.

(30) Foreign Application Priority Data

Feb. 27, 1997 (JP) .................................. 9-044406

(51) Int. Cl.
*H04B 10/18* (2006.01)

(52) U.S. Cl. ................. 398/147; 398/159; 398/167

(58) Field of Classification Search ................ 398/147, 398/159, 167
See application file for complete search history.

(56) References Cited

U.S. PATENT DOCUMENTS

| | | | |
|---|---|---|---|
| 5,074,631 A | 12/1991 | Hamano et al. | |
| 5,113,278 A | 5/1992 | Degura et al. | |
| 5,170,274 A | 12/1992 | Kuwata et al. | |
| 5,184,243 A | 2/1993 | Henmi et al. ................ 359/181 |
| 5,303,079 A | 4/1994 | Gnauck et al. | |
| 5,343,322 A | 8/1994 | Pirio et al. | |
| 5,355,240 A | 10/1994 | Prigent et al. | |
| 5,361,319 A | 11/1994 | Antos et al. | |
| 5,367,594 A | 11/1994 | Essert et al. | |
| 5,392,147 A | 2/1995 | Kaede et al. ................ 359/181 |
| 5,453,868 A | 9/1995 | Bluvelt et al. | |
| 5,467,213 A | 11/1995 | Kaede et al. ................ 359/175 |
| 5,574,590 A | 11/1996 | Edagawa et al. | |

(Continued)

FOREIGN PATENT DOCUMENTS

CN 1003398 B 2/1989

(Continued)

OTHER PUBLICATIONS

U.S. Appl. No. 08/929,090, filed Sep. 15, 1997, A. Miyauchi et al., Fujitsu Limited.

(Continued)

*Primary Examiner*—Leslie Pascal
(74) *Attorney, Agent, or Firm*—Staas & Halsey LLP

(57) ABSTRACT

In an optical transmission system comprising a transmitter, a receiver, and a transmission line that connects the transmitter and the receiver, a dispersion compensator is disposed in the receiver. The transmitter comprises an E/O (electro-optical signal converter) and a post-amplifier. An optical signal that has been RZ-coded is supplied to the E/O. The transmitter pre-chirps the optical signal. The pre-chirp is performed by red-chirp of which the value of the chirping parameter $\alpha$ is positive. When the pre-chirp is performed, the non-linear effect of the optical signal on the transmission line can be canceled. In addition, with the RZ coded signal, the inter-symbol interference can be alleviated. Thus, the total dispersion amount of the dispersion compensator can be suppressed. In addition, the power of the optical output can be increased.

3 Claims, 15 Drawing Sheets

U.S. PATENT DOCUMENTS

| | | | |
|---|---|---|---|
| 5,606,445 A | 2/1997 | Kituchi et al. | |
| 5,608,562 A | 3/1997 | Delavaux et al. | 359/161 |
| 5,612,808 A | 3/1997 | Audouin et al. | |
| 5,663,823 A | 9/1997 | Suzuki | 359/181 |
| 5,680,491 A * | 10/1997 | Shigematsu et al. | 385/24 |
| 5,701,188 A | 12/1997 | Shigematsu et al. | 359/161 |
| 5,717,510 A | 2/1998 | Ishikawa et al. | 359/161 |
| 5,717,801 A * | 2/1998 | Smiley | 385/60 |
| 5,805,321 A | 9/1998 | Ooi et al. | |
| 5,877,881 A | 3/1999 | Miyauchi et al. | |
| 5,886,804 A | 3/1999 | Onaka et al. | 359/161 |
| 6,393,182 B1 * | 5/2002 | Sakano | 385/38 |
| 6,417,945 B1 * | 7/2002 | Ishikawa et al. | 398/79 |
| 6,570,691 B1 | 5/2003 | Miyauchi et al. | 359/161 |

FOREIGN PATENT DOCUMENTS

| | | |
|---|---|---|
| CN | 1041963 C | 2/1999 |
| EP | 0186819 | 2/1989 |
| EP | 0575881 A1 | 12/1993 |
| EP | 590633 A1 | 4/1994 |
| EP | 0732819 A2 | 9/1996 |
| EP | 802642 A2 | 10/1997 |
| GB | 2299473 A | 10/1996 |
| JP | 3-171941 | 7/1991 |
| JP | 5-110517 | 4/1993 |
| JP | 7-74699 | 3/1995 |
| JP | 9-284218 | 3/1995 |
| JP | 7-327012 | 12/1995 |
| JP | 8-274715 | 10/1996 |
| JP | 8-316909 | 11/1996 |
| JP | 8-316912 | 11/1996 |
| JP | 8-321805 | 12/1996 |
| JP | 10-242910 | 9/1998 |

OTHER PUBLICATIONS

U.S. Appl. No. 08/752,516, filed Nov. 20, 1996, A. Miyauchi et al., Fujitsu Limited.

Henmi et al., "10-GB/S, 100-km Normal Fiber Transmission Experiment Employing a Modified Prechirp Technique", Tech. Dig. Conf. On Fiber Commun (1991).

"Ultrahigh bit rate transmission and dispersion management techniques" Designing Techniques of Posts and Telecommunications, 1996, No. 10, pp. 10-14.

Francois Ouellette et al., "All-Fiber Devices for Chromatic Dispersion Compensation Based on Chirped Distributed Resonated Coupling", Journal of Lightwave Tech., vol. 12, No. 10, Oct. 1994.

Bob Jopson et al., "Dispersion Compensation for Optical Fiber Systems", IEEE Communication Magazine, Jun. 1995.

Chinese Office Action of Application No. 02157189.9 mailed Dec. 9, 2005.

Naoya Henmi et al., "Prechirp Technique as a Linear Dispersion Compensation for Ultrahigh-Speed Long-Span Intensity Modulation Directed Detection Optical Communication System" *Journal of Lightwave Technology*, vol. 12, No. 10, Oct. 1994, pp. 1706-1719.

George Ishikawa et al., "10-Gb/s Repeaterless Transmission Using Standard Single-Mode fiber with Pre-Chirping and Dispersion Compensation Techniques" *IEICE Transactions on Electronics*, vol. E78-C, No. 1, Jan. 1995, pp. 43-48.

A.H. Gnauck et al., "Dispersion Penalty Reduction Using an Optical Modulator with Adjustable Chirp" *IEEE Photonics Technology Letters*, vol. 3, No. 10, Oct. 1991, pp. 916-918.

* cited by examiner

EXTERNAL LN MODULATOR
NRZ CODE

DUTY : 100 %
CHIRPING PARAMETER α : +1
OUTPUT POWER : +14 dBm
COMPENSATION AMOUNT
ON TRANSMITTER SIDE : -600 ps/nm

| TRANSMISSION DISTANCE (km) | COMPENSATION AMOUNT OF RECEIVER SIDE (ps/nm) | | |
|---|---|---|---|
| | 0 | -600 | -1200 |
| | TOTAL DISPERSION COMPENSATION AMOUNT (ps/nm) | | |
| | -600 | -1200 | -1800 |
| 10 | ■ | | |
| 20 | ■ | | |
| 30 | ■ | | |
| 40 | ■ | ■ | |
| 50 | ■ | ■ | |
| 60 | ■ | ■ | |
| 70 | ■ | ■ | |
| 80 | | ■ | ■ |
| 90 | | ■ | ■ |
| 100 | | ■ | ■ |
| 110 | | ■ | ■ |
| 120 | | | ■ |
| 130 | | | ■ |
| 140 | | | ■ |

■ TRANSMISSIBLE RANGES

TOLERANCE OF DISPERSION COMPENSATION AMOUNT ON RECEIVER SIDE OF CONVENTIONAL SYSTEM

FIG. 4A

EXTERNAL LN MODULATOR
RZ CODE

DUTY : 50 %
CHIRPING PARAMETER α : +1
OUTPUT POWER : +14 dBm
COMPENSATION AMOUNT
ON TRANSMITTER SIDE : 0 ps/nm

| TRANSMISSION DISTANCE (km) | COMPENSATION AMOUNT OF RECEIVER SIDE (ps/nm) | | | |
|---|---|---|---|---|
| | 0 | -600 | -1200 | -1800 |
| | TOTAL DISPERSION COMPENSATION AMOUNT (ps/nm) | | | |
| | 0 | -600 | -1200 | -1800 |
| 10 | ■ | ■ | | |
| 20 | ■ | ■ | | |
| 30 | ■ | ■ | | |
| 40 | | ■ | ■ | |
| 50 | | ■ | ■ | |
| 60 | | ■ | ■ | |
| 70 | | ■ | ■ | ■ |
| 80 | | | ■ | ■ |
| 90 | | | ■ | ■ |
| 100 | | | ■ | ■ |
| 110 | | | | ■ |
| 120 | | | | ■ |
| 130 | | | | ■ |
| 140 | | | | ■ |

■ TRANSMISSIBLE RANGES

TOLERANCE OF DISPERSION COMPENSATION AMOUNT ON RECEIVER SIDE ACCORDING TO PRESENT INVENTION

FIG. 4B

EXTERNAL LN MODULATOR
NRZ CODE

DUTY : 100 %
CHIRPING PARAMETER $\alpha$ : +1
OUTPUT POWER : +17 dBm
COMPENSATION AMOUNT
ON TRANSMITTER SIDE : −600 ps/nm

| TRANSMISSION DISTANCE (km) | COMPENSATION AMOUNT OF RECEIVER SIDE (ps/nm) | | |
| --- | --- | --- | --- |
| | 0 | −600 | −1200 |
| | TOTAL DISPERSION COMPENSATION AMOUNT (ps/nm) | | |
| | −600 | −1200 | −1800 |
| 10 | ▓ | | |
| 20 | ▓ | | |
| 30 | ▓ | | |
| 40 | | | |
| 50 | | ▓ | |
| 60 | | ▓ | |
| 70 | | ▓ | |
| 80 | | | |
| 90 | | | ▓ |
| 100 | | | ▓ |
| 110 | | | |
| 120 | | | |
| 130 | | | |
| 140 | | | |

▓ TRANSMISSIBLE RANGES

F I G. 5 A

EXTERNAL LN MODULATOR
RZ CODE

DUTY : 50 %
CHIRPING PARAMETER $\alpha$ : +1
OUTPUT POWER : +17 dBm
COMPENSATION AMOUNT
ON TRANSMITTER SIDE : 0 ps/nm

| TRANSMISSION DISTANCE (km) | COMPENSATION AMOUNT OF RECEIVER SIDE (ps/nm) | | |
| --- | --- | --- | --- |
| | 0 | −600 | −1200 |
| | TOTAL DISPERSION COMPENSATION AMOUNT (ps/nm) | | |
| | 0 | −600 | −1200 |
| 10 | ▓ | | |
| 20 | ▓ | | |
| 30 | ▓ | | |
| 40 | ▓ | | |
| 50 | ▓ | ▓ | |
| 60 | ▓ | ▓ | |
| 70 | ▓ | ▓ | |
| 80 | ▓ | | |
| 90 | | ▓ | ▓ |
| 100 | | ▓ | ▓ |
| 110 | | ▓ | ▓ |
| 120 | | | ▓ |
| 130 | | | ▓ |
| 140 | | | ▓ |

▓ TRANSMISSIBLE RANGES

F I G. 5 B

EXTERNAL EA MODULATOR
NRZ CODE

DUTY : 100 %
CHIRPING PARAMETER α : −0.7~+2.0
OUTPUT POWER : +17 dBm
COMPENSATION AMOUNT
ON TRANSMITTER SIDE : −600 ps/nm

| TRANSMISSION DISTANCE (km) | COMPENSATION AMOUNT OF RECEIVER SIDE (ps/nm) | | |
|---|---|---|---|
| | 0 | −600 | −1200 |
| | TOTAL DISPERSION COMPENSATION AMOUNT (ps/nm) | | |
| | −600 | −1200 | −1800 |
| 10 | ▨ | | |
| 20 | ▨ | | |
| 30 | ▨ | | |
| 40 | ▨ | | |
| 50 | ▨ | ▨ | |
| 60 | ▨ | ▨ | |
| 70 | | ▨ | |
| 80 | | ▨ | ▨ |
| 90 | | ▨ | ▨ |
| 100 | | | ▨ |
| 110 | | | ▨ |
| 120 | | | ▨ |
| 130 | | | ▨ |
| 140 | | | |

▨ TRANSMISSIBLE RANGES

F I G. 7 A

EXTERNAL EA MODULATOR
RZ CODE

DUTY : 50 %
CHIRPING PARAMETER α : −0.7~+2.0
OUTPUT POWER : +17 dBm
COMPENSATION AMOUNT
ON TRANSMITTER SIDE : 0 ps/nm

| TRANSMISSION DISTANCE (km) | COMPENSATION AMOUNT OF RECEIVER SIDE (ps/nm) | | |
|---|---|---|---|
| | 0 | −600 | −1200 |
| | TOTAL DISPERSION COMPENSATION AMOUNT (ps/nm) | | |
| | 0 | −600 | −1200 |
| 10 | ▨ | | |
| 20 | ▨ | ▨ | |
| 30 | ▨ | ▨ | |
| 40 | ▨ | ▨ | |
| 50 | ▨ | ▨ | |
| 60 | ▨ | ▨ | |
| 70 | ▨ | ▨ | |
| 80 | | ▨ | ▨ |
| 90 | | ▨ | ▨ |
| 100 | | ▨ | ▨ |
| 110 | | ▨ | ▨ |
| 120 | | ▨ | ▨ |
| 130 | | ▨ | ▨ |
| 140 | | | ▨ |

▨ TRANSMISSIBLE RANGES

F I G. 7 B

EXTERNAL LN MODULATOR   RZ CODE

OPTICAL DUTY : 50 %
CHIRPING PARAMETER α : +1
OUTPUT POWER : +19 dBm
DISPERSION AMOUNT
ON TRANSMISSION SIDE : 0 ps/nm

| TRANSMISSION DISTANCE (km) | DISPERSION COMPENSATION AMOUNT ON RECEIVER SIDE (ps/nm) | | | | |
|---|---|---|---|---|---|
| | 0 | -600 | -1200 | -1800 | -2400 |
| 10 | ▓ | | | | |
| 20 | ▓ | | | | |
| 30 | ▓ | | | | |
| 40 | | ▓ | | | |
| 50 | | ▓ | | | |
| 60 | | ▓ | | | |
| 70 | | ▓ | | | |
| 80 | | | ▓ | | |
| 90 | | | ▓ | | |
| 100 | | | ▓ | | |
| 110 | | | ▓ | ▓ | |
| 120 | | | | ▓ | |
| 130 | | | | ▓ | |
| 140 | | | | ▓ | |
| 150 | | | | | ▓ |
| 160 | | | | | |

▓ TRANSMISSIBLE RANGES

FIG. 9A

EXTERNAL LN MODULATOR   RZ CODE

OPTICAL DUTY : 50 %
CHIRPING PARAMETER α : +1
OUTPUT POWER : +20 dBm
DISPERSION AMOUNT
ON TRANSMISSION SIDE : 0 ps/nm

| TRANSMISSION DISTANCE (km) | DISPERSION COMPENSATION AMOUNT ON RECEIVER SIDE (ps/nm) | | | | |
|---|---|---|---|---|---|
| | 0 | -600 | -1200 | -1800 | -2400 |
| 10 | ▓ | | | | |
| 20 | ▓ | | | | |
| 30 | | | | | |
| 40 | | ▓ | | | |
| 50 | | | | | |
| 60 | | ▓ | | | |
| 70 | | | ▓ | | |
| 80 | | | | | |
| 90 | | | ▓ | | |
| 100 | | | ▓ | | |
| 110 | | | | ▓ | |
| 120 | | | | | |
| 130 | | | | ▓ | |
| 140 | | | | | ▓ |
| 150 | | | | | |
| 160 | | | | | ▓ |

▓ TRANSMISSIBLE RANGES

FIG. 9B

EXTERNAL LN MODULATOR    RZ CODE

OPTICAL DUTY           : 50 %
CHIRPING PARAMETER α   : +1
OUTPUT POWER           : +17 dBm
DISPERSION AMOUNT ON
TRANSMITTER SIDE       :  0 ps/nm

| TRANSMISSION DISTANCE (km) | DISPERSION COMPENSATION AMOUNT ON RECEIVER SIDE (ps/nm) | |
|---|---|---|
| | 0 | −1200 |
| 10 | ▓ | |
| 20 | ▓ | |
| 30 | ▓ | |
| 40 | ▓ | |
| 50 | ▓ | |
| 60 | ▓ | |
| 70 | ▓ | |
| 80 | ▓ | ▓ |
| 90 | | ▓ |
| 100 | | ▓ |
| 110 | | ▓ |
| 120 | | ▓ |
| 130 | | ▓ |
| 140 | | ▓ |
| 150 | | ▓ |
| 160 | | |

0 ~ 80 km   NO DISPERSION COMPENSATION

80 ~150 km  DISPERSION COMPENSATION AMOUNT ON RECEIVER SIDE : −1200 ps/nm

▓ TRANSMISSIBLE RANGES

FIG. 10

EXTERNAL LN MODULATOR    RZ CODE

OPTICAL DUTY : 50 %
CHIRPING PARAMETER α : +1
OUTPUT POWER : +17 dBm
DISPERSION AMOUNT
ON TRANSMITTER SIDE : 0 ps/nm

| TRANSMISSION DISTANCE (km) | DISPERSION COMPENSATION AMOUNT ON RECEIVER SIDE (ps/nm) | | | |
|---|---|---|---|---|
| | 0 | -600 | -1200 | -1500 |
| 10 | ▩ | ▩ | | |
| 20 | ▩ | | | |
| 30 | ▩ | | | |
| 40 | ▩ | | | |
| 50 | ▩ | ▩ | | |
| 60 | ▩ | ▩ | | |
| 70 | ▩ | ▩ | | |
| 80 | ▩ | ▩ | | |
| 90 | | ▩ | ▩ | |
| 100 | | ▩ | ▩ | ▩ |
| 110 | | ▩ | ▩ | ▩ |
| 120 | | | ▩ | ▩ |
| 130 | | | ▩ | ▩ |
| 140 | | | ▩ | ▩ |
| 150 | | | ▩ | ▩ |
| 160 | | | | ▩ |

▩ TRANSMISSIBLE RANGES

FIG. 11A

EXTERNAL LN MODULATOR    RZ CODE

OPTICAL DUTY : 50 %
CHIRPING PARAMETER α : +1
OUTPUT POWER : +16 dBm
DISPERSION AMOUNT
ON TRANSMITTER SIDE : 0 ps/nm

| TRANSMISSION DISTANCE (km) | DISPERSION COMPENSATION AMOUNT ON RECEIVER SIDE (ps/nm) | | | |
|---|---|---|---|---|
| | 0 | -600 | -1200 | -1500 |
| 10 | ▩ | ▩ | | |
| 20 | ▩ | | | |
| 30 | ▩ | | | |
| 40 | ▩ | | | |
| 50 | ▩ | | | |
| 60 | ▩ | | | |
| 70 | | ▩ | | |
| 80 | | ▩ | ▩ | |
| 90 | | ▩ | ▩ | ▩ |
| 100 | | | ▩ | ▩ |
| 110 | | | ▩ | ▩ |
| 120 | | | ▩ | ▩ |
| 130 | | | ▩ | ▩ |
| 140 | | | | ▩ |
| 150 | | | | ▩ |
| 160 | | | | |

▩ TRANSMISSIBLE RANGES

FIG. 11B

| TRANSMISSION DISTANCE (km) | DISPERSION COMPENSATION AMOUNT ON RECEIVER SIDE (ps/nm) | | | |
|---|---|---|---|---|
| | 0 | -600 | -1200 | -1500 |
| 10 | ▨ | | | |
| 20 | ▨ | | | |
| 30 | ▨ | | | |
| 40 | ▨ | | | |
| 50 | ▨ | | | |
| 60 | ▨ | ▨ | | |
| 70 | | ▨ | | |
| 80 | | ▨ | | |
| 90 | | ▨ | | |
| 100 | | | ▨ | |
| 110 | | | ▨ | |
| 120 | | | ▨ | |
| 130 | | | ▨ | ▨ |
| 140 | | | | ▨ |
| 150 | | | | ▨ |
| 160 | | | | |

0~60 km  NO DISPERSION COMPENSATION AMOUNT ON RECEIVER SIDE
60~100 km  DISPERSION COMPENSATION AMOUNT ON RECEIVER SIDE : − 600 ps/nm
100~130 km  DISPERSION COMPENSATION AMOUNT ON RECEIVER SIDE : −1200 ps/nm
130~150 km  DISPERSION COMPENSATION AMOUNT ON RECEIVER SIDE : −1500 ps/nm

▨ TRANSMISSIBLE RANGES

FIG. 12

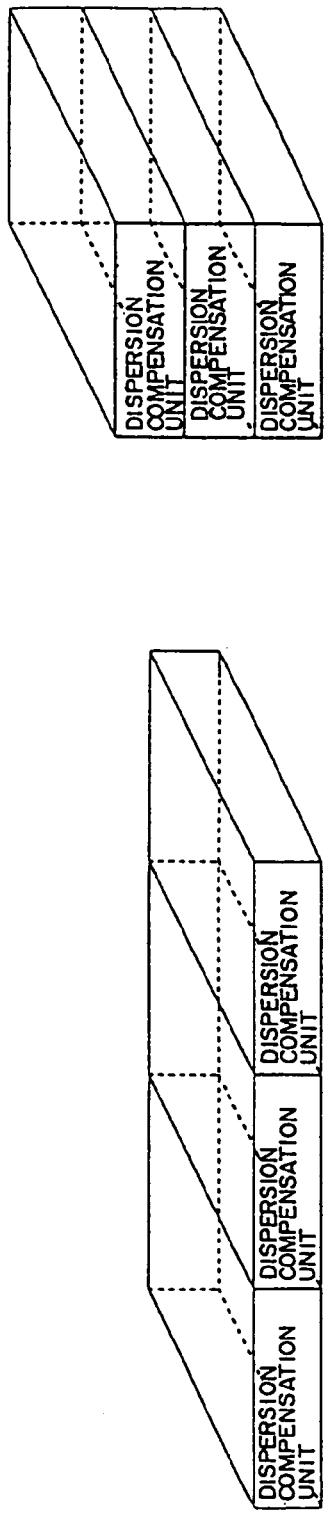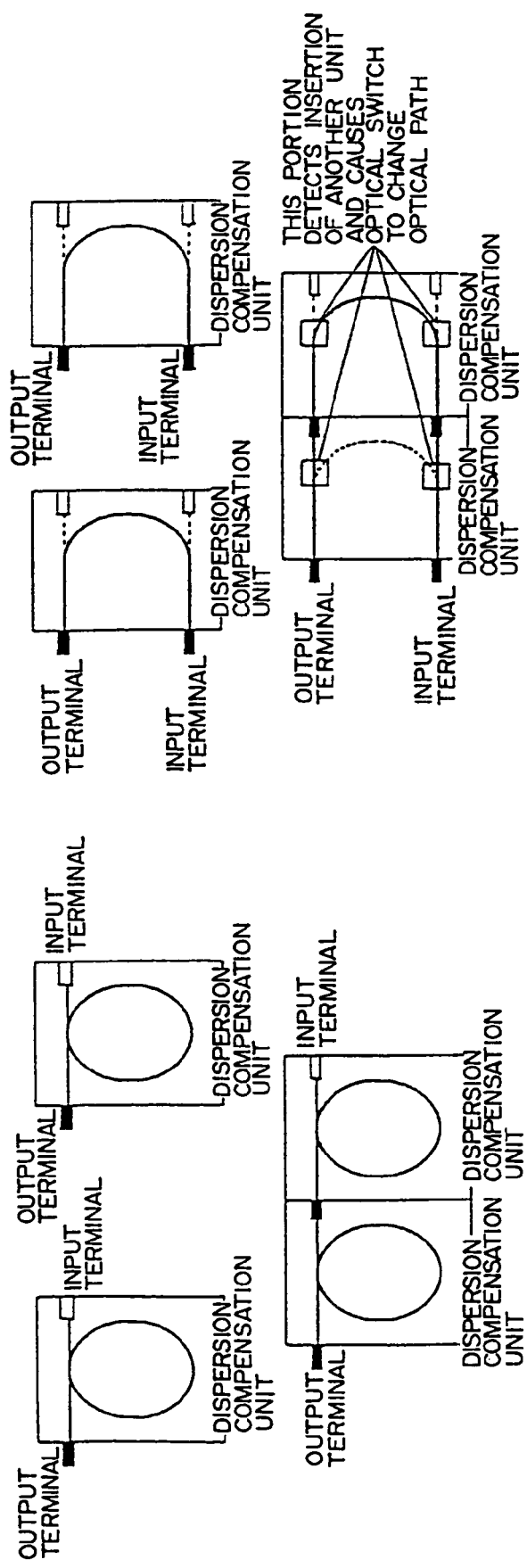

OPTICAL TRANSMISSION SYSTEM AND DISPERSION COMPENSATOR

CROSS REFERENCE TO RELATED APPLICATIONS

This application is a divisional of application Ser. No. 09/749,774, filed Dec. 28, 2000, now U.S. Pat. No. 6,823, 141, which is continuation of application Ser. No. 08/922, 677, filed Sep. 3, 1997, now abandoned.

BACKGROUND OF THE INVENTION

1. Field of the Invention

The present invention relates to an optical transmission system using an optical fiber cable as a transmission line.

2. Description of the Related Art

Optical transmission systems have been developed for large transmission capacity and long span transmission. For accomplishing the large transmission capacity, the increase of bit rate and wavelength division multiplexing system have been studied. For accomplishing the long span transmission, optical amplifiers are used. The optical amplifiers are categorized as for example a post-amplifier that raises the transmission power, a pre-amplifier that raises the sensitivity of received power, and an in-line amplifier that functions as a repeater. These optical amplifiers have been developed as products. With the optical amplifiers, the difference of levels of a received signal and a transmitted signal becomes large and the allowable loss of an optical fiber cable becomes large.

On the other hand, with optical amplifiers, the optical input level to the optical fiber cable becomes high. Thus, a new problem called non-linear effect has taken place. As an example, when the level of an optical signal that is input to the optical fiber cable is large (for example, +8 dBm for a dispersion shifted optical fiber cable and +10 dBm or more for a single mode optical fiber cable), a frequency (wavelength) shift takes place at a leading edge and a trailing edge of a pulse of the optical signal due to the optical Kerr effect (the refractive index varies depending on the intensity of light) (this phenomenon is referred to as self phase modulation). In this case, even if the spectral width of an optical signal before the transmission is narrow, the spectral width becomes wide through transmission. In addition, due to the influence of the dispersion of the optical signal on the transmission line, the waveform of the received signal becomes degraded. In other words, the upper limit of the power of transmission optical signal depends on such an influence.

Moreover, since the velocity of light that propagates in an optical fiber cable depends on the wavelength thereof, after an optical pulse with a particular wavelength is transmitted through an optical fiber cable, the pulse width may be expanded or compressed. This phenomenon is referred to as chromatic dispersion in optical fiber cable. Thus, after an optical signal is transmitted through an optical fiber cable of an optical transmission system, the waveform of the received signal varies due to the chromatic dispersion. Depending on the degree of the chromatic dispersion, a transmission error takes place. Thus, the transmission distance may be restricted due to the chromatic dispersion.

So far, transmission deterioration due to the chromatic dispersion on the optical fiber cable is prevented using a light source with a narrow wavelength width. However, in recent years, due to high bit rate of 10 Gb/s and the non-linear effect of an optical fiber cable, the transmission deterioration cannot be prevented using a light source with a narrow wavelength width.

To solve such a problem, an optical transmission system with a dispersion compensation has been used. However, since the cost of the dispersion compensator is high and the dispersion compensation amount varies corresponding to the transmission distance, there need be a variety of products. Thus, it is difficult to use the optical transmission system with a dispersion compensator.

In such a conventional technology, as a pre-chirp of the transmitter, a blue chirp (chirping parameter $\alpha<0$) is used. In addition, a dispersion compensator is placed on the receiver side (between a pre-amplifier and an optical-electrical signal converter (O/E)) (namely, post compensation is performed). However, in this system, since the compensation is inflexibly performed, the loss of the dispersion compensator becomes large. The loss cannot be ignored when the transmission distance becomes long. In addition, since the input level of the optical signal becomes low, the receiver sensitivity degrades. Moreover, since the tolerance of the dispersion compensation amount for proper transmission characteristics is narrow, dispersion compensators should be prepared corresponding to the transmission distance. Thus, many types of products should be prepared. To solve such a problem, a system in which a red chirp (chirping parameter $\alpha>0$) is used as a pre-chirp on the transmitter side and dispersion compensators are disposed on both the transmitter side and the receiver side was considered. FIG. 1 shows a basic structure of this system.

FIG. 1 is a block diagram showing an outlined structure of a conventional optical transmission system.

The optical transmission system shown in FIG. 1 comprises a transmitter 160, a transmission line 164 (composed of an optical fiber cable), and a receiver 165. The transmitter 160 comprises an E/O (electric-optical signal converter) 161, a dispersion compensator 162, and a post-amplifier 163. The E/O 161 converts an electric signal into an NRZ coded optical signal. The post-amplifier 163 amplifies the optical signal and sends the resultant signal to the transmission line 164. The receiver 165 comprises a pre-amplifier 166, a dispersion compensator 167, and an O/E (optical-electric signal converter) 168. The pre-amplifier 166 amplifies weakened light that has been transmitted through the transmission line 164. The dispersion compensator 167 compensates for the dispersion of the optical signal that has been transmitted through the transmission line 164. The O/E 168 converts an optical signal into an electric signal.

In the conventional optical transmission system, the transmitter 160 red-chirps an optical signal as a pre-chirp. In addition, the transmitter 160 uses an NRZ coded signal as an optical signal. The dispersion compensator 162 in the transmitter 160 compensates for a predetermined dispersion amount of an optical signal so as to cancel the dispersion of the optical signal propagated on the transmission line 164. The post-amplifier 163 amplifies the intensity of an optical signal so that it can be transmitted for a long distance.

The pre-amplifier 166 in the receiver 165 amplifies a weakened optical signal propagated on the transmission line 164 so that the optical signal can be detected. The dispersion compensator 167 adjusts the dispersion compensation amount corresponding to a dispersion amount of the transmission line 164 detected by the receiver 165 so that the receiver 165 can correctly detect the optical signal. Thus, the dispersion compensator 167 in the receiver 165 can adjust the dispersion compensation amount. The O/E 168 converts an optical signal into an electric signal. The O/E 168 sends the received signal to an electric signal processing unit (not shown) disposed downstream thereof so as to demodulate the electric signal and extract data from the optical signal.

Thus, in the system shown in FIG. 1, the transmitter 160 red-chirps an optical signal. In addition, both the transmitter 160 and the receiver 165 have respective dispersion compensators.

In this compensation system, the dispersion compensation on the transmitter side is effective. The transmitter compresses pulses corresponding to the chirping and the characteristics of the dispersion compensator. Thus, inter-symbol interference due to the increase of the pulse width on the transmission line is alleviated. In addition, since the red-chirping is used, the influence of the non-linear effect (SPM) on the transmission line is canceled. Thus, the deterioration of the waveform of the transmission signal is smaller than that in the case of the blue-chirping. Thus, since the tolerance of the compensation amount is wide, the number of types of dispersion compensators can be reduced.

However, as a problem of the system, since the dispersion compensation amount is large, many dispersion compensation optical fiber cables that are expensive should be used. Thus, the cost of the system becomes high. In addition, since the transmitter and the receiver require respective dispersion compensators, the size of the system becomes large.

SUMMARY OF THE INVENTION

Therefore, an object of the present invention is to provide a technology for accomplishing an apparatus that compensates both the chromatic dispersion of an optical fiber cable and the transmission deterioration of an optical signal due to the non-linear effect, that has sufficient transmission characteristics for a high-power and long-distance optical transmission system, and that is structured at lower cost and in a smaller size than before.

An optical transmission system according to the present invention comprises a transmitter that transmits an optical signal, a transmission line that propagates the optical signal, and a receiver that receives the optical signal transmitted through the transmission line. In a high-output-power and high-transmission-rate optical transmission system of which an optical signal propagated in the transmission line is dispersed due to the non-linear effect, the transmitter generates an RZ coded optical signal and transmits the resultant signal.

Conventionally, such an optical transmission system with high output power and high transmission rate uses an NRZ coded signal. However, since such a signal is subject to inter-symbol interference, the dispersion compensation amount is large. A dispersion compensator that compensates the dispersion of an optical signal is expensive. In addition, the dispersion compensator requires a space to be disposed. Thus, such a dispersion compensator prevents the cost and size of the apparatus from being reduced.

In contrast, according to the present invention, since an RZ coded signal is used, the inter-symbol interference can be suppressed. Thus, the dispersion compensation amount can be reduced. Alternatively, according to the present invention, an optical signal can be transmitted for a longer distance with the same dispersion compensation amount. Thus, the cost and size of the apparatus can be reduced.

In addition, although the receiver has a dispersion compensator that compensates the dispersion of an optical signal propagated through the transmission line, the transmitter does not require a dispersion compensator. Thus, the present invention contributes to reducing the size of the transmitter.

Moreover, since the transmitter pre-chirps an RZ coded optical signal and transmits the resultant signal, the optical signal can be prevented from being affected by the non-linear effect (that is proportional to the output power of the optical signal) on the transmission line. Thus, the optical signal can be transmitted for a long distance with a small dispersion compensation amount.

In the optical transmission system according to the present invention, the dispersion compensator disposed on the receiver side is composed of a plurality of dispersion compensation units each of which has a predetermined or standardized dispersion compensation amount.

Thus, when the dispersion compensation amount is adjusted on the receiver side, with a combination of the dispersion compensation units, it is not necessary to prepare a dispersion compensator corresponding to a required dispersion compensation amount. Consequently, according to the present invention, the optical transmission system can compensate for the dispersion of an optical signal simply and inexpensively.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 4A and 4B are tables showing simulation results of tolerance of dispersion compensation amounts for the NRZ code and the RZ code;

FIGS. 5A and 5B are tables showing comparison of transmissible ranges in the case of high optical output power for the conventional art and the present invention;

FIGS. 7A and 7B are tables showing simulation results of tolerance of dispersion compensation amounts for the NRZ code and the RZ code in the case that an external EA modulator is used;

FIGS. 9A and 9B are tables showing simulation results in the case that output power is increased in the external LN modulator;

FIG. 10 is a table showing a structure of which an optical transmission system is structured with the external LN modulator;

FIGS. 11A and 11B are tables showing another structure of an optical transmission system according to the present invention;

FIG. 12 is a table showing a structure of an optical transmission system and transmissible ranges in the case that an optical output is in the range from +16 to +17 dBm;

FIGS. 13A to 13D are schematic diagrams for explaining a dispersion compensation unit of the dispersion compensator;

DESCRIPTION OF PREFERRED EMBODIMENTS

Figure 1:
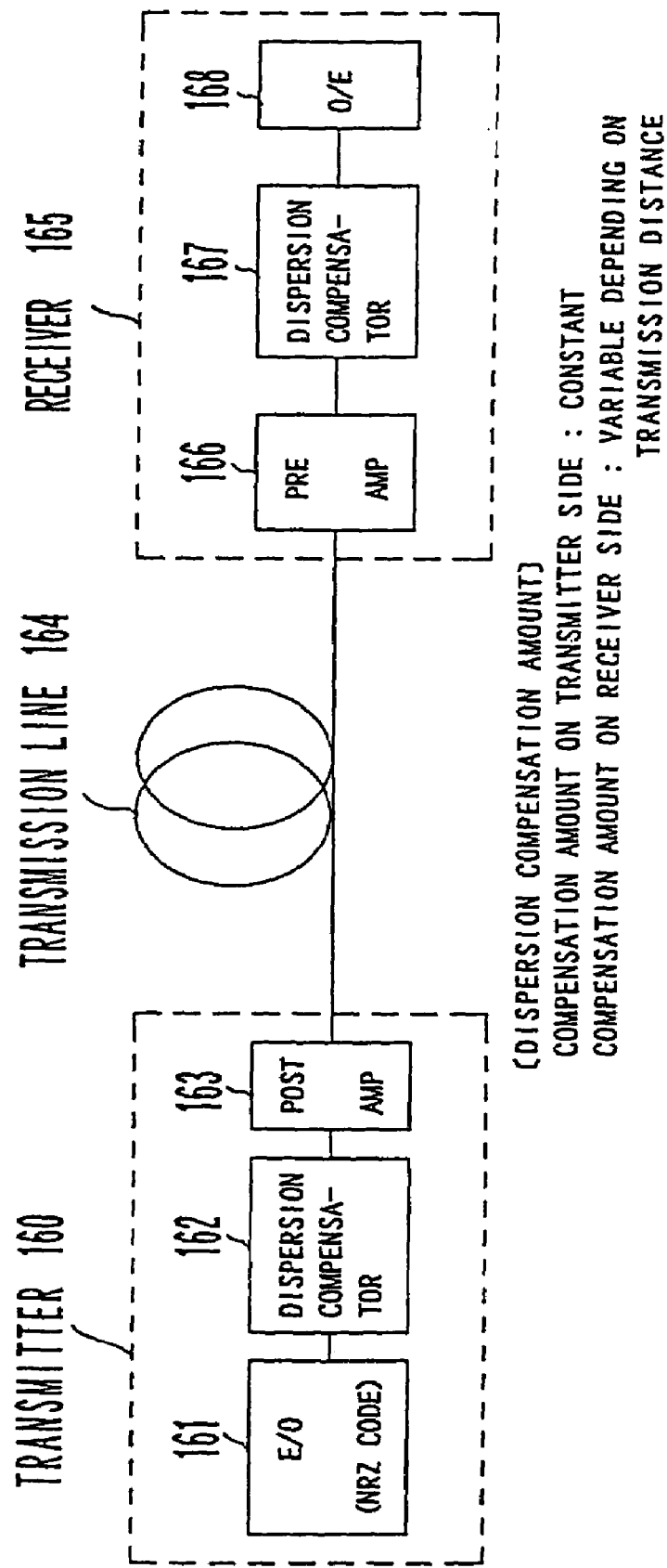
FIG. 1 is a block diagram showing an outlined structure of a conventional optical transmission system.
Figure 2:
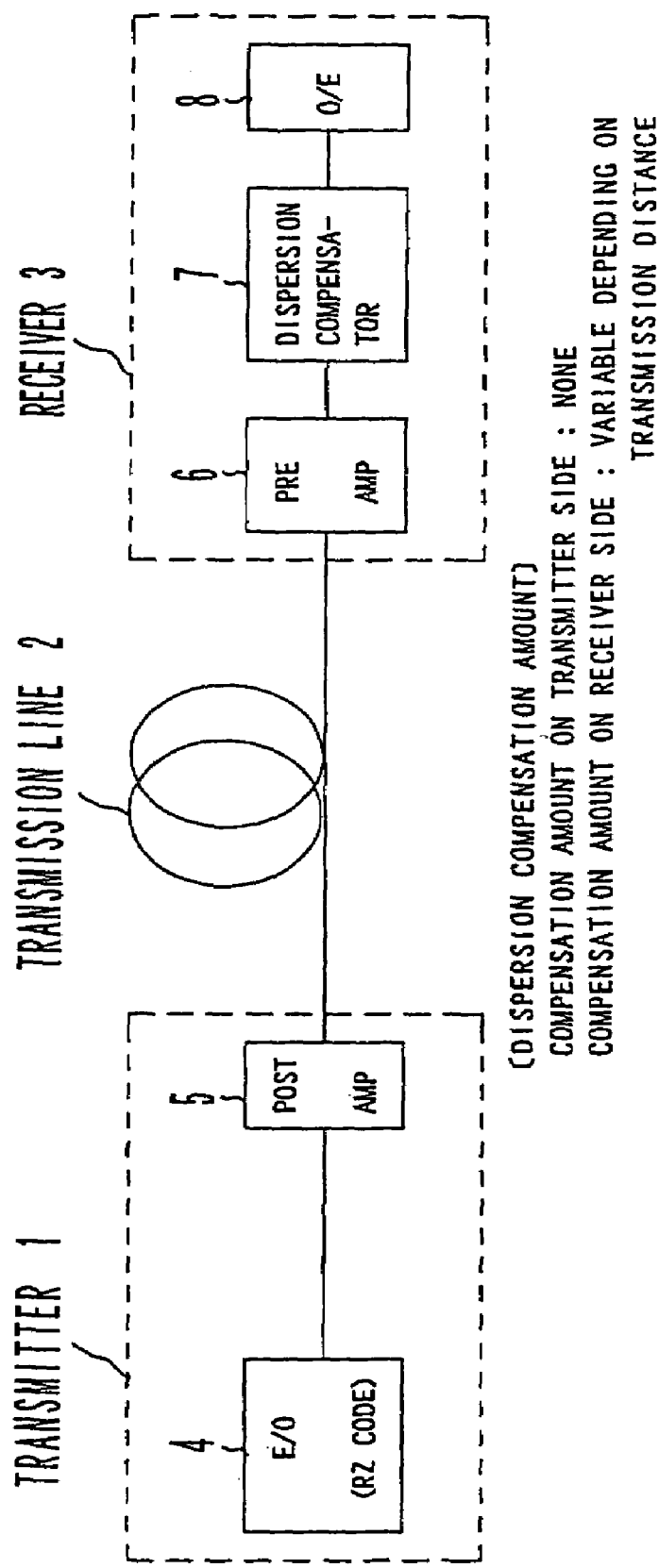
FIG. 2 is a block diagram showing an outlined structure of a first embodiment of the present invention.

FIG. 2 shows a basic structure of an embodiment of the present invention.

The present invention is an optical transmission system that uses RZ code instead of NRZ code in the case that the transmitter uses red chirp (whose chirping parameter is positive) as pre-chirp.

In the optical transmission system according to the present invention, a transmitter 1 and a receiver 3 are connected with a transmission line 2. The transmitter 1 comprises an E/O 4 and a post-amplifier 5. The receiver 3 comprises a pre-amplifier 6, a dispersion compensator 7, and an O/E 8.

When the transmitter 1 converts data into an optical signal, an RZ signal is used instead of a conventional NRZ signal. After an RZ coded electric signal is converted into an optical signal by the E/O 4, the optical signal is red-chirped and then sent to the post-amplifier 5. The chirping indicates phenomena in the laser and so on, in which the wavelength of optical pulses varies as time passes. Generally, it is considered that laser or the like should be suppressed from chirping. In contrast, according to the present invention, optical pulses are intentionally chirped so as to cancel the non-linear effect of the optical signal propagated through the transmission line.

The intensity of chirping is represented by a parameter referred to as the chirping parameter α. Generally, the intensity of chirping is defined by α=2·(dφ)/dt)/((dS/dt)/S) where φ is an optical phase and S is the intensity of light. In particular, in the case of blue-chirp of which the wavelength of light is varied to longer wavelength side, the value of the chirping parameter α is negative. In the case of red chirp of which the wavelength of light is varied to shorter wavelength side, the value of the chirping parameter α is positive. When an optical fiber cable has a positive chromatic dispersion against an optical signal, by the optical signal being blue-chirped (the value of the chirping parameter α is negative), the transmission characteristics are improved. In contrast, when an optical fiber cable has a negative chromatic dispersion against an optical signal, by the optical signal being red-chirped (the value of the chirping parameter α is positive), the transmission characteristics are improved. This is because in a combination of a positive chromatic dispersion and a blue-chirp or a combination of a negative chromatic dispersion and a red-chirp, the trailing edge of an optical pulse propagates faster in an optical fiber cable than the leading edge thereof. Thus, the optical pulse is compressed.

In the optical transmission system, an optical signal is red-chirped. In addition, as an important point, the optical signal is RZ-coded. The RZ-coded signal is less affected by the inter-symbol interference due to the increase of the width of pulses on the transmission line than the NRZ coded signal. Thus, the same effect as the case that an optical signal is pulse-compressed with a dispersion compensator disposed on the transmitter side can be obtained. Consequently, in the system according to the present invention, the dispersion compensator on the transmitter side can be omitted.

As the next important point, the system according to the present invention has a higher output power than the conventional optical transmission system that uses the NRZ code. Generally, as the output power increases, the influence of SPM (the non-linear effect) becomes strong and thereby the waveform largely varies. Thus, the resultant optical signal cannot be compensated. In the case of the NRZ code, since the pulse width depends on the signal pattern, the influence of SPM varies. As the output power increases, the distortion of the waveform becomes large. In contrast, in the case of the RZ code, since the individual pulse width does not depend on the signal pattern, even if the influence of SPM is strong, all pulses are equally varied. Thus, in this case, the distortion of the waveform is small. Consequently, with the RZ code, a higher output power can be obtained than with the NRZ code. This means that the system gain is increased and the transmission distance is increased.

According to the present invention, with the RZ coded signal, the dispersion compensator on the transmitter side can be omitted. In addition, a high power can be obtained.

Figure 3A:
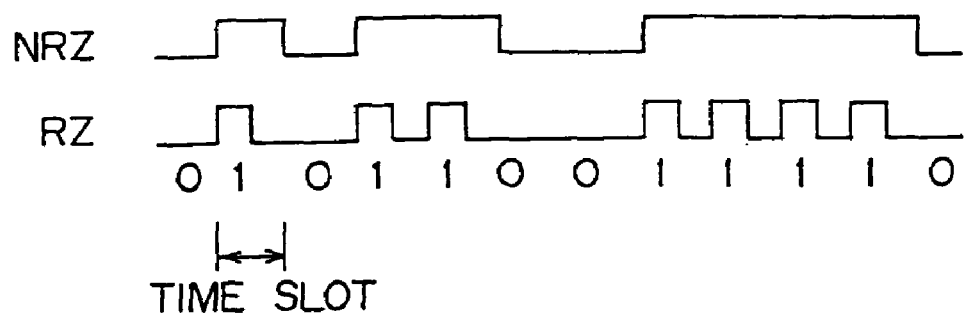
FIGS. 3A and 3B are schematic diagrams for explaining an NRZ code and an RZ code.
Figure 3B:
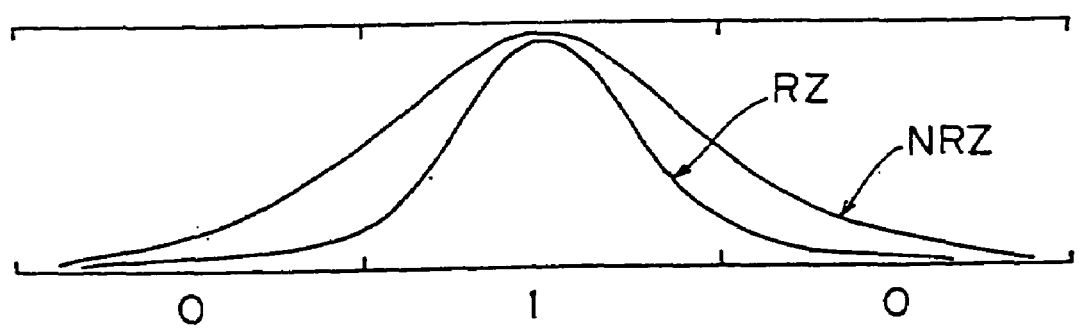

FIGS. 3A and 3B are schematic diagrams for explaining the NRZ code and the RZ code.

The upper signal and the lower signal shown in FIG. 3A are the NRZ code and the RZ code, respectively. Generally, as encoding systems, there are NRZ and RZ. As shown in FIG. 3A, the period of a time slot of logic level "1" of the NRZ code is different from that of the RZ code. In the case of the NRZ code, the logical level "1" occupies one whole time slot (pulse width 100%). In contrast, in the case of the RZ code, the logical level "1" occupies part of one time slot (pulse width 30 to 80%, in particular, 50%).

Thus, since the pulse width of the RZ code is smaller than the pulse width of the NRZ code, when pulses are band-limited and thereby the waveform becomes broadened, the resultant pulses lesser affect the adjacent time slots than the NRZ code.

FIG. 3B shows such a situation.

As shown in FIG. 3A, in the case of the NRZ code, when pulses with logic level "1" successively take place, the pulse width increases corresponding to the number of the pulses. In contrast, in the case of the RZ code, the pulse width is always constant. FIG. 3B shows one time slot in which an NRZ coded pulse and an RZ coded pulse are present. The NRZ coded pulse is formed in one whole time slot. On the other hand, the RZ code pulse is formed in part of one time slot (for example 50% of one time slot). Thus, as shown in FIG. 3B, the NRZ code is more broadened than that of the RZ code. Thus, the NRZ code is subject to inter-symbol interpolation. Consequently, the dispersion of the NRZ coded signal should be more compensated than the RZ coded signal. In contrast, the RZ code is less widened by dispersion or the like, the inter-symbol interference is small. Thus, when an optical signal is transmitted a predetermined distance, the dispersion compensation amount of the RZ code is smaller than that of the NRZ code. Consequently, the dispersion compensator on the transmitter side can be omitted.

FIGS. 4A and 4B show simulation results of tolerance of dispersion compensation in the case that the NRZ code and the RZ code are used.

It is assumed that simulation results that follow are performed at a high transmission rate of 10 Gbit/sec.

FIG. 4A shows simulation results in the case that an optical signal is NRZ-modulated with an external LN modulator (Mach-Zehnder type modulator). In this case, since the NRZ signal is used, it is assumed that the duty of the optical signal is 100% and the chirping parameter α is +1. In addition, it is assumed that the output power of the optical signal is 14 dBm and the dispersion compensation amount on the transmitter side is −600 ps/nm (constant). On the receiver side, the dispersion compensation amount is varied from 0 to −1200 ps/nm with an increment of −600 ps/nm. With each of these dispersion compensation amounts, the transmissible distance of the optical signal is obtained by simulation.

In this example, it is defined that the transmissible distance is a transmissible range of which the amplitude is decreased by 10% or less and the pulse width is deformed by 70% or less.

Referring to FIG. 4A, in the case that the dispersion compensation amount on the receiver side is 0, when the total dispersion compensation amount that is the dispersion compensation amount on the transmitter side is −600 ps/nm, the transmissible distance is up to 80 km. In the case that the dispersion compensation amount on the receiver side is −600 ps/nm, the total dispersion compensation amount is −1200 ps/nm. At this point, the transmissible distance is in the range from 40 km to 120 km. When the compensation amount on the receiver side is −1200 ps/nm, the total dispersion compensation amount is −1800 ps/nm. At this point, the transmissible distance is in the range from 80 km to 140 km. When the total dispersion compensation amount is −1200 ps/nm or −1800 ps/nm, an optical signal can not be transmitted in a relatively short distance. This is because an excessive dispersion compensation causes the waveform of the optical signal to be largely distorted and thereby data cannot be correctly received.

In contrast, FIG. 4B shows simulation results of an optical transmission system according to the present invention. The optical transmission system uses RZ code. In this case, the dispersion compensation amount on the transmitter side is 0. The other conditions are the same as those shown in FIG. 4A. However, since the RZ code is used in the optical transmission system according to the present invention, duty is 50%. In this case, although the duty of the RZ code is 50%, the effect of the present invention can be obtained with the RZ code. Generally, the duty is in the range from 30% to 80%.

Since the dispersion compensation is not performed on the transmitter side, the total dispersion compensation amount is equal to the dispersion compensation amount on the receiver side. However, as shown in FIG. 4B, even if the total dispersion compensation amount is 0 ps/nm (namely, the dispersion compensation is not performed at all), the transmissible distance is up to 30 km. When the dispersion compensation amount on the receiver side is −600 ps/nm, the transmissible distance becomes 70 km. When the dispersion compensation amount on the receiver side is −1200 ps/nm, the transmissible distance is in the range from 40 km to 100 km. When the dispersion compensation amount on the receiver side is −1800 ps/nm, the transmissible range is in the range from 70 km to 140 km.

Although the system shown in FIG. 4B omits a dispersion compensator on the transmitter side, the system can accomplish the same transmissible ranges as those of the conventional NRZ system shown in FIG. 4A, thereby configuration of the optical transmission system of the present invention can be reduced.

FIGS. 5A and 5B show comparison of transmissible ranges of the conventional system and the system according to the present invention in the case that output power is increased.

The conditions in FIGS. 5A and 5B are the same as those in FIGS. 4A and 4B except that the output power of the optical signal is 17 dBm.

When the optical output power in the conventional system is increased as shown in FIG. 5A, the non-linear effect on the transmission line increases. Thus, since the optical signal is largely deteriorated, it is difficult to adjust the dispersion amount.

As is clear from FIG. 5A, assuming that the dispersion compensation amounts are the same as those shown in FIGS. 4A and 4B, in the case of the NRZ signal, when the total dispersion compensation amount is −600 ps/nm, the transmissible distance is up to 30 km. When the total dispersion compensation is −1200 ps/nm, the transmissible distance is in the range from 50 km to 70 km. When the total dispersion compensation is −1800 ps/nm, the transmissible distance is in the range from 90 km to 100 km. Thus, in this case, the transmission deterioration becomes strong. Not only over 110 km, but also, in particular, when the transmission distance is around 40 km or 80 km, an optical signal cannot be correctly transmitted.

Thus, with the predetermined dispersion compensation amounts, a variety of systems cannot be structured corresponding to the desired transmission distance. Consequently, the dispersion compensation amounts should be more finely adjusted. In particular, when an optical signal is transmitted for 110 km or more, a dispersion compensation amount of −1800 ps/nm or more is required. Thus, many dispersion compensation cables that are expensive are required.

In contrast, FIG. 5B shows transmissible ranges in the case that the RZ code according to the present invention is used. Referring to FIG. 5B, even if the dispersion compensation amount is 0, the transmissible distance is up to 80 km. When the dispersion compensation amount is −1200 ps/nm, the transmissible distance is up to 140 km. When there are three types of dispersion compensation amounts 0, −600, and −1200 ps/nm, an optical signal can be transmitted up to 140 km without a non-transmissible region. With these types of dispersion compensation amounts, any optical transmission system that can transmit an optical system for up to 140 km can be accomplished.

Since the optical output powers of the structures shown in FIGS. 5A and 5B are higher than those of the structures shown in FIGS. 4A and 4B, an optical signal can be transmitted for a longer distance than the latter. Only with the RZ signal, the total dispersion amount of the system is decreased. Thus, the quantity of the expensive dispersion compensation optical fiber cables can be reduced. Consequently, the system according to the present invention is cost-effective.

Figure 6:
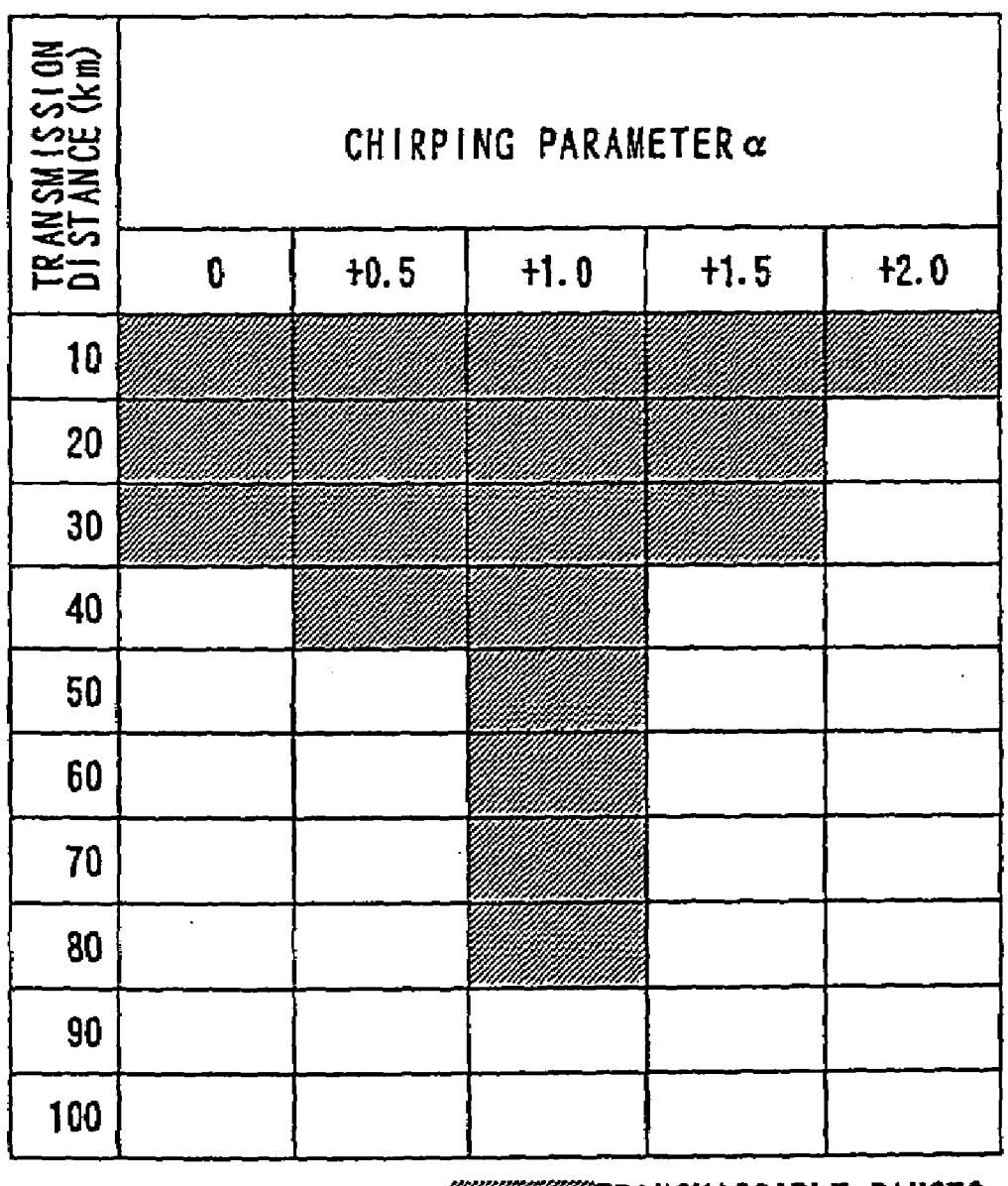
FIG. 6 is a table showing variation of transmission distance corresponding to variation of chirping parameter $\alpha$.

FIG. 6 shows the relation between chirping parameter $\alpha$ and transmission distance.

In the simulation shown in FIG. 6, an optical signal is RZ-coded with an external LN modulator. The dispersion of optical signals on the transmitter side and the receiver side is not compensated. In this example, the relation between the chirping parameter $\alpha$ and the transmission distance is obtained. In this example, it is assumed that the transmission rate is 10 Gbit/sec and the optical output power is +17 dBm.

In these conditions, FIG. 6 shows that when the value of the chirping parameter $\alpha$ is positive, the transmission distance varies depending on the value of the chirping parameter $\alpha$. In particular, in such conditions, when the value of the chirping parameter $\alpha$ is +1.0, an optical signal can be transmitted for the longest distance. Thus, when the optical output power is +17 dBm, the chirping parameter $\alpha$ is preferably set to +1.0.

The chirping parameter $\alpha$ represents the intensity of pre-chirp performed for the optical signal on the transmitter side. The pre-chirp causes the frequency of the optical signal to be shifted so as to compensate the non-linear effect on the transmission line. However, the non-linear effect depends on the optical output power. Thus, as the optical output power increases, the non-linear effect becomes large. Consequently, it is assumed that when the optical output power is varied, the optimum chirping parameter α that cancels the non-linear effect is varied. When the transmission distance is constant, the frequency shift amount of the light source is proportional to the transmission output power. Thus, the optimum value of the chirping parameter α is proportional to the variation of the transmission output power. Consequently, in FIG. 5, although the optimum value of the chirping parameter α is +1.0, from the view point of the real range of the transmission output power, the optimum value of the chirping parameter α is in the range from 0 to +2.0.

In each example shown in FIGS. 4A to 6, an external LN modulator was used. When the external LN modulator is used, since the chirping parameter α is treated as a constant, the optimum value of the chirping parameter α can be set corresponding to the optical output power. As an example of such an external modulator, an external EA (Electro-Absorption) modulator (or loss modulator) is commonly used. When the external EA modulator is used, the chirping mechanism of the EA modulator is subtly affected by the applied voltage. Thus, it should be considered that the value of the chirping parameter α is dynamically varied.

FIGS. 7A and 7B show simulation results of tolerance of dispersion compensation amounts of optical transmission for the NRZ code and the RZ code in the case that the external EA modulator is used.

In this case, it is assumed that the output power of the transmission optical signal is +17 dBm and the value of the chirping parameter α dynamically varies in the range from −0.7 to +2.0. FIG. 7A shows the case that the NRZ code is used. Referring to FIG. 7A, with three types of total dispersion compensation amounts −600, −1200, and −1800 ps/nm, the transmission distance of up to 130 km can be accomplished.

On the other hand, FIG. 7B shows the tolerance of the transmission distance for the RZ signal. In this case, with three types of dispersion compensation amounts 0, −600, and −1200 ps/nm, the transmission distance of up to 140 km can be accomplished. However, in this case, a dispersion compensator is not disposed on the transmitter side. In other words, with a total dispersion compensation amount of −1200 ps/nm, the transmission distance of up to 140 km can be accomplished. Thus, the total dispersion compensation amount shown in FIG. 7B is smaller than that shown in FIG. 7A.

Thus, the number of the expensive dispersion compensation optical fiber cables is reduced. In addition, with the external EA modulator, the same effect as the external LN modulator can be obtained. In particular, with a total dispersion compensation amount of −600 ps/nm shown in FIG. 7B, the transmission distance of up to 130 km can be accomplished. In other words, in comparison with the structure shown in FIG. 7A, with one type of total dispersion compensation amount, a longer transmission distance (tolerance) can be flexibly accomplished.

Figure 8:
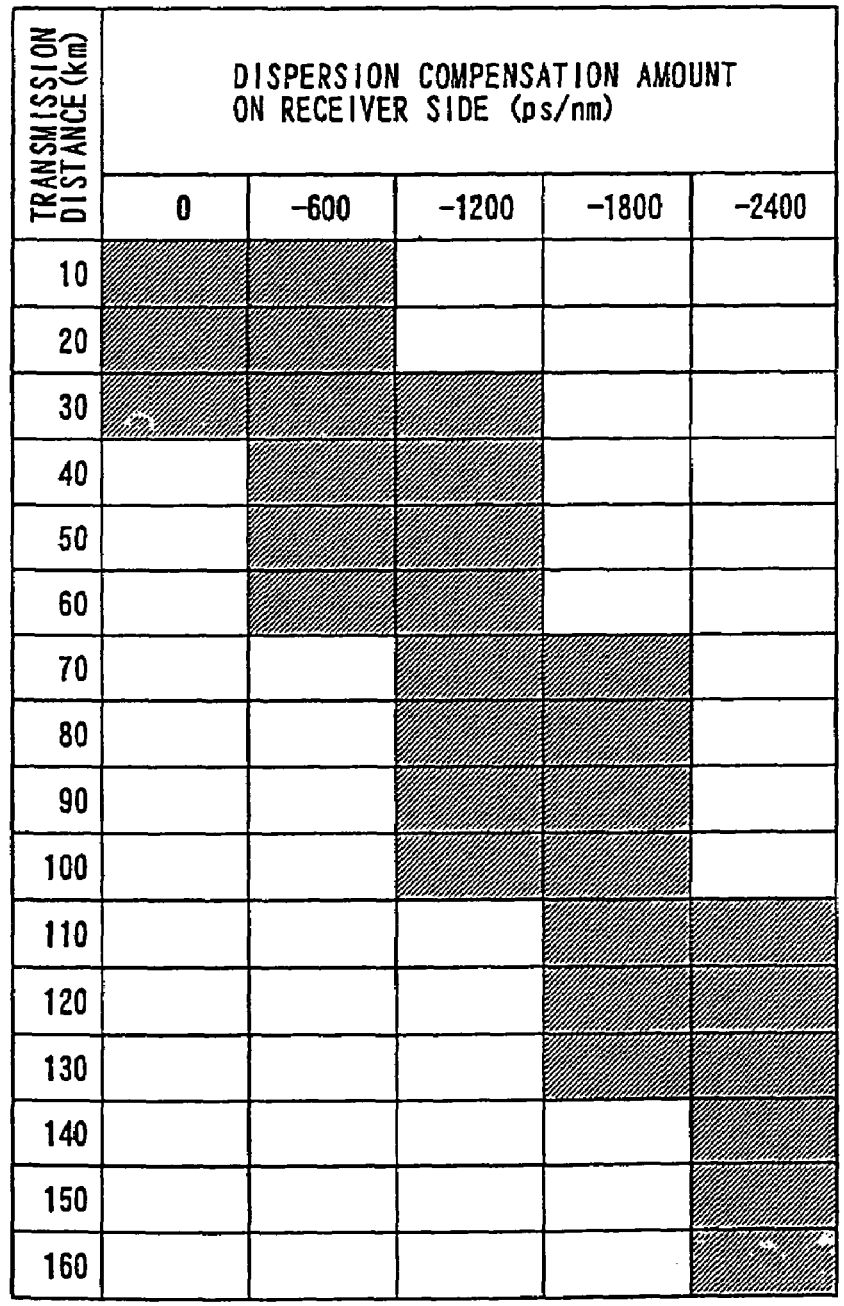
FIG. 8 is a table showing simulation results of transmissible ranges in the case that optical transmission output power is decreased in an external LN modulator.

FIG. 8 shows simulation results of transmission distance in the case that the output power of an optical signal is decreased in the external LN modulator.

In FIG. 8, the RZ code is used. In addition, it is assumed that the chirping parameter α is +1 and the output power is +13 dBm. Moreover, on the transmitter side, dispersion compensation is not performed. In this case, the dispersion compensation amount necessary for a long distance transmission is large. When the output power is decreased, even if the RZ code is used, the effects of which the dispersion compensation amount is decreased and the transmission distance is increased are lost. Thus, to perform an optical transmission for long distance, the output power should be increased to some extent. In addition, the RZ code should be used. However, since it is clear that corresponding to the value of the chirping parameter α, the transmission distance varies, the situation in FIG. 8 can be solved by properly adjusting the value of the chirping parameter α.

FIGS. 9A and 9B show simulation results in the case that the output power is increased in the external LN modulator.

In the case shown in FIG. 9A, the value of the chirping parameter α is +1 and the output power is +19 dBm. In this structure, since the output power is large and thereby the non-linear effect is large, to transmit an optical signal for a long distance, the dispersion compensation amount should be large. However, in the structure shown in FIG. 9A, compensating the deterioration of the waveform due to the non-linear effect can be archived by the dispersion compensation amount being increased. Thus, this structure can be applied for various optical transmission systems. In this structure, although the value of the chirping parameter α is +1, when it is properly adjusted, the tolerance of the transmission distance can be improved.

FIG. 9B shows simulation results in the case that the output power is +20 dBm.

As is clear from FIG. 9B, when the output power is +20 dBm, due to the influence of the non-linear effect, the effect of the dispersion compensation of the waveform deterioration is restricted. With five types of dispersion compensation amounts, there is a distance for which an optical signal cannot be transmitted. Thus, to allow an optical signal to be transmitted at a distance of up to 160 km, dispersion compensation amounts should be more finely provided. In addition, the value of the chirping parameter α should be more properly set. In contrast, it is assumed that when the value of the chirping parameter α is properly set, even if the output power is +20 dBm, the number of types of dispersion compensation amounts can be relatively decreased. To obtain a good effect with the RZ code, it is considered that the upper limit of the output power is around +20 dBm.

FIG. 10 shows an example of the structure of an optical transmission system with the external LN modulator according to the present invention.

In this example, the RZ encoding method with a duty of 50% is used as the encoding method of an optical signal. In addition, the output power is +17 dBm. The value of the chirping parameter α is set to +1 so that the longest transmission distance is accomplished with the output power. The dispersion compensation of the optical signal is not performed on the transmitter side. The receiver side has two types of dispersion compensation amounts, 0 ps/nm and −1200 ps/nm.

The transmission distance accomplished in such a structure is up to 80 km with a dispersion compensation amount of 0 ps/nm on the receiver side as shown in FIG. 10. With a dispersion compensation amount of −1200 ps/nm on the receiver side, the transmission distance is in the range from 80 km to 150 km. The transmissible distance of the dispersion compensation amount 0 ps/nm overlaps with the transmission distance of the dispersion compensation amount −1200 ps/nm. Thus, with two types of the dispersion compensation amounts, any transmission distance of up to 150 km can be accomplished. In addition, since the dispersion compensation is not performed on the transmitter side, the quantity of the dispersion compensation optical fiber cables can be reduced. In other words, the number of types of dispersion compensation amounts on the receiver side is only two. Since one type of the dispersion compensation amount is 0, the type of the dispersion compensation optical fiber cable necessary on the receiver side is substantially −1200 ps/nm. Thus, the quantity of expensive dispersion compensation optical fiber cables can be reduced. In addition, the space of the dispersion compensation optical fiber cables can be reduced.

FIGS. 11A and 11B show other examples of structures of an optical transmission system according to the present invention.

In the structure shown in FIG. 11A, the RZ code with a duty of 50% is used. The value of the chirping parameter α is +1. The output power is +17 dBm. The dispersion compensation is not performed on the transmitter side. The conditions shown in FIG. 11A are the same as the conditions shown in FIG. 10. However, in the structure shown in FIG. 11A, the number of types of dispersion compensation amounts is larger than that shown in FIG. 10 so as to satisfy a variety of needs of optical transmission systems.

For example, in the system shown in FIG. 10, at a transmission distance of 80 km, the types of dispersion compensation amounts should be switched. When the optical transmission system is used for a distance ranging from 60 km to 100 km, the types of dispersion compensation amounts should be switched at a transmission distance of 80 km. So it is inconvenient.

In contrast, in the structure shown in FIG. 11A, since the types of dispersion compensation amounts are more finely set than the structure shown in FIG. 10, such a problem can be solved. For example, when the optical transmission system is used for a transmission distance ranging from 60 km to 100 km, with one type of dispersion compensation amount of −600 ps/nm, such a transmission range can be accomplished. Thus, when an optical transmission system is structured for such a transmissible range, dispersion compensation optical fiber cables with a dispersion compensation amount of −600 ps/nm are disposed on the receiver side.

The structure shown in FIG. 11B is basically the same as the structure shown in FIG. 11A. However, the output power of the structure shown in FIG. 11B is slightly lower (+16 dBm) than that shown in FIG. 11A. When the output power is weakened, the influence of the non-linear effect on the transmission line can be alleviated.

However the transmission distance of the structure shown in FIG. 11B is shorter than the structure shown in FIG. 11A.

FIG. 12 shows the structure and transmissible distance of an optical transmission system in the case that the optical output power is in the range from +16 to +17 dBm.

The conditions of the optical transmission system shown in FIG. 12 are the same as those shown in FIGS. 11A and 11B. Thus, in the structure shown in FIG. 12, the RZ code with a duty of 50% is used. The value of the chirping parameter α is +1. The dispersion compensation is not performed on the transmitter side. The number of types of dispersion compensation amounts on the receiver side are 0, −600, −1200, and −1500 ps/nm. In the structure shown in FIG. 12, the optical output power is in the range from +16 to +17 dBm. However, with the same types of dispersion compensation on the receiver side as those used for FIGS. 11A and 11B, a transmission distance of up to 150 km is satisfied.

As shown in FIGS. 10 to 12, with the RZ code and pre-chirped transmission signal of which the value of the chirping parameter α is positive (particularly, +1), when the optical signal is transmitted for a relatively short distance, it is not necessary to perform the dispersion compensation for the signal. In other words, in an optical transmission system that transmits an optical signal for a relatively short distance, an optical signal can be correctly transmitted and received without need to use expensive dispersion compensation optical fiber cables. Thus, the cost of the system can be reduced. In addition, since the space for the dispersion compensation optical fiber cables is not required, the size of the transmitter/receiver can be reduced.

On the other hand, when the dispersion compensation is performed on the receiver side, with a small number of types of dispersion compensation amounts, a long transmission distance can be covered. Thus, it is not necessary to use many types of dispersion compensation optical fiber cables. Consequently, the cost of the system can be reduced.

Particularly, in all cases, it is not necessary to perform dispersion compensation on the transmitter side. Thus, since the dispersion compensation is omitted on the transmitter side, the cost of the system according to the present invention can be reduced in comparison with the conventional optical transmission systems. In addition, the size of the transmitter can be reduced.

Since the dispersion compensation amounts on the receiver side in the above-described examples are increased by −600 or −300 ps/nm, the dispersion compensator on the receiver side can be accomplished by a combination of dispersion compensation units, each of which has the same dispersion compensation amount.

In other words, the dispersion compensation amount should be changed corresponding to the transmission distance (the dispersion amount on the transmission line). In the conventional method, the dispersion amount is measured for each transmission line and the dispersion compensation amount is set so that the residual dispersion amount becomes constant. In this method, however, a number of dispersion compensators are required. Thus, the dispersion compensators should be order-made and thereby they cannot be used from a view point of cost. Alternatively, the transmission distance is categorized as classes and the dispersion compensation amount is set for each class. However, in this case, when there are many types of dispersion compensation amounts, a large number of spare parts are required. Thus, this method is not practical from a view point of cost.

However, according to the present invention, the minimum unit of a predetermined compensation amount (for example, −300 ps/nm) is set. Basically, only one type of dispersion compensator unit is used. A plurality of the units are successively connected so as to obtain the required dispersion compensation amount corresponding to the transmission distance. With such a dispersion compensator, even if the system is moved and thereby the transmission distance is changed, it is not necessary to change the dispersion compensator units. Instead, a required number of dispersion compensation units are added or deleted. In addition, since the number of types of spare parts is one, the system according to the present invention is very effective from a view point of cost.

However, depending on the use conditions (such as deviation of optical fibers and variation of output power), the desired transmission characteristics may not be obtained in the above-described method. In such a situation, an extra dispersion compensation unit (with a dispersion compensation amount of −100 ps/nm) may be used so as to precisely adjust the transmission characteristics in case of such a situation.

In addition, there is a case of which the input/output level of a dispersion compensator is fixed and the loss of the dispersion compensator should be in a predetermined range regardless of the dispersion compensation amount. Examples of this case are that the input level of the O/E and the input level of the post-amplifier is fixed. In this case, an additional optical attenuator is used. Alternatively, when optical fibers are spliced, the optical axis thereof may be intentionally deviated so as to have a loss. Thus, even if the dispersion compensation amount is varied, the loss of the dispersion compensator satisfies the required range so that it does not affect units downstream thereof.

As a method for connecting the dispersion compensation units, optical fiber cables are spliced (fibers are melted) or connectors are used. Alternatively, the units may have a detachable structure.

FIGS. 13A to 13D are schematic diagrams for explaining the dispersion compensation units of the dispersion compensator.

FIGS. 13A and 13B show arrangements of dispersion compensation units. FIG. 13A shows a vertical or horizontal arrangement of the dispersion compensation units. FIG. 13B shows a layered arrangement of the dispersion compensation units.

FIGS. 13C and 13D show connecting methods in these arrangements. In FIG. 13C, an input terminal or an output terminal is disposed on a side facing another dispersion compensation unit. The other type of terminal is disposed on the opposite side of the dispersion compensation unit. In FIG. 13D, both an input terminal and an output terminal are disposed on one side of a dispersion compensation unit. In this case, the unit has a switching circuit. When the terminals are inserted, the unit detects them and opens the closed portion.

In the system shown in FIG. 11A, when the transmission distance with single mode optical fiber cables is 140 km, the receiver side requires a dispersion compensation amount of −1200 ps/nm. This dispersion compensation amount can be accomplished with four dispersion compensation units each of which has a dispersion compensation amount of −300 ps/nm. In this case, to change the transmission distance of the system to 110 km, two dispersion compensation units are removed.

Figure 14A:
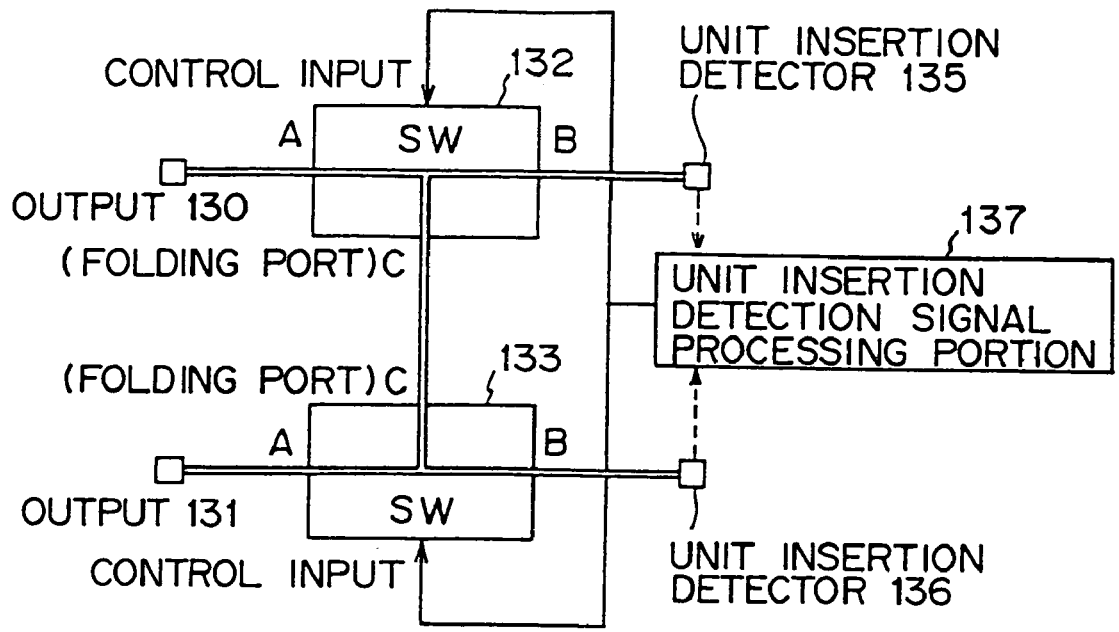
FIGS. 14A and 14B are schematic diagrams showing a structure of an optical switch of the dispersion compensation unit of the dispersion compensator.
Figure 14B:
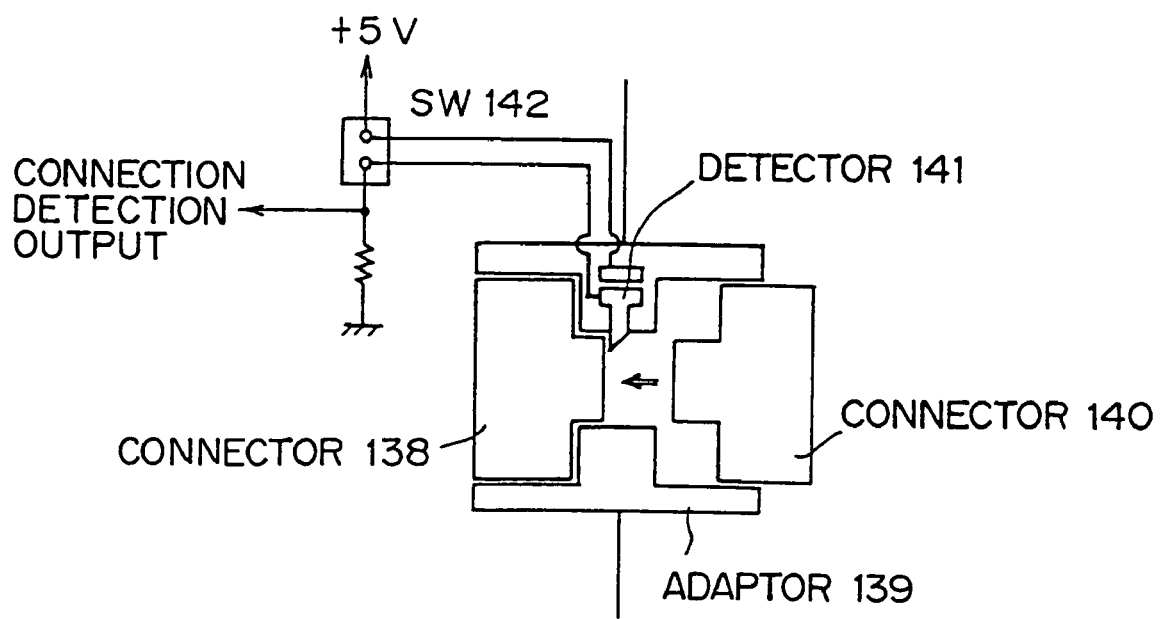

FIGS. 14A and 14B show an example of the construction of an optical switch used in the dispersion compensation unit of the dispersion compensator.

FIG. 14A shows the structure for detecting the insertion of the dispersion compensation unit in the structure shown in FIG. 13D. When switches 132 and 133 are closed, an optical path is formed between portions A and C. In this case, light enters from an output port 130 and exits from an output port 131. Alternatively, light may enter from the output port 131 and exit from the output port 130. The dispersion compensation is performed at the portion A of the optical path. The portion C of the optical path is a normal optical path that does not have the dispersion compensation function.

When another dispersion compensation unit is connected as the next stage to the existing dispersion compensation unit, the output ports of the next stage dispersion compensation unit are attached to unit insertion detectors 135 and 136. The unit insertion detectors 135 and 136 detect the insertion of the next stage dispersion compensation unit and send signals to a unit insertion detection signal processing portion 137. The unit insertion detection signal processing portion 137 sends a control signal to the switches 132 and 133 corresponding to the received signal. Thus, the switches 132 and 133 change the optical path so that light travels between the portions A and B.

The structures of the switches 132 and 133 are not limited as long as they receive electric signals and change the optical paths. Examples of the switches 132 and 133 are mechanical switches that are commercially available.

FIG. 14B show a real example of the structure of the unit insertion detector.

The unit insertion detector is disposed at an adaptor 139 of a connector 138 of the dispersion compensation unit. In the case of the structure shown in FIG. 14B, a nail-shaped protrusion is disposed as a detecting portion 141. When a connector 140 disposed at an output port of the next stage dispersion compensation unit is attached to the adaptor 139, the nail of the detecting portion 141 is moved and thereby a switch 142 connected thereto is turned on. Thus, a connection detection signal is generated. The unit insertion detection signal processing portion 137 detects the connection detection signal and switches the optical path of the dispersion compensation unit.

In the above description, dispersion compensation optical fiber cables are used. However, other dispersion compensation means may be used.

Figure 15A:
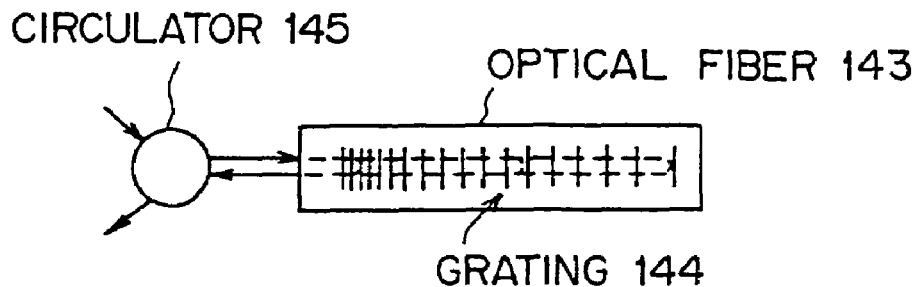
FIGS. 15A to 15C are schematic diagrams showing structures of dispersion compensation means other than the dispersion compensation optical fiber cables.
Figure 15B:
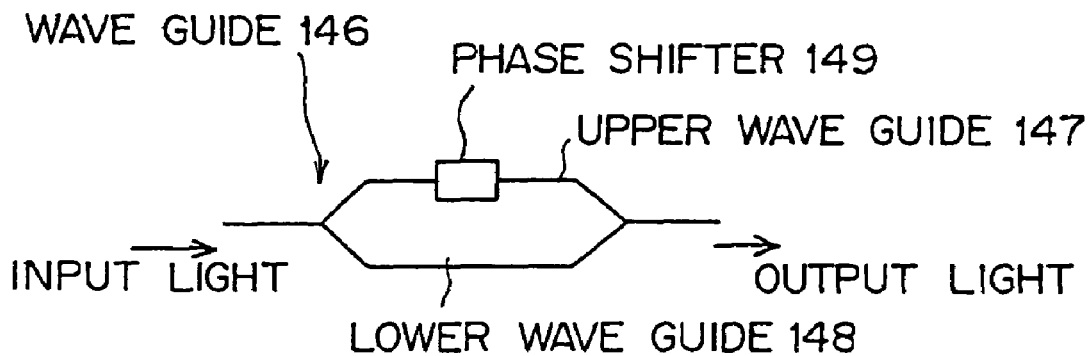
Figure 15C:
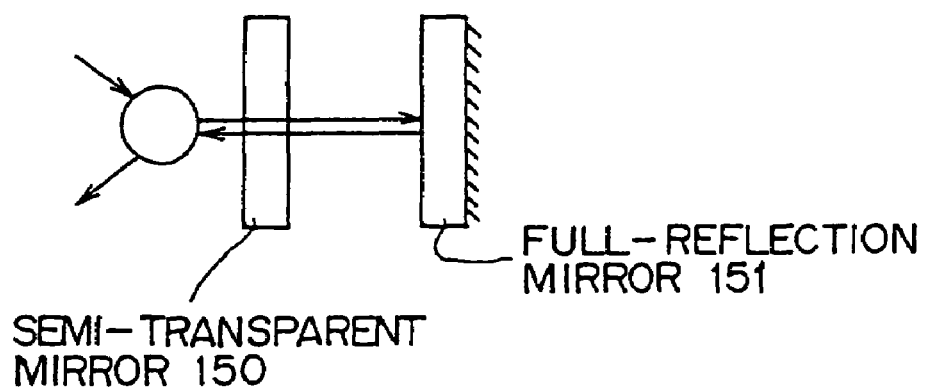

FIGS. 15A to 15C show examples of structures of dispersion compensation means other than the dispersion compensation optical fiber cables.

FIG. 15A shows a fiber grating type dispersion equalizer.

Refractive index of optical fibers is grated (the grated portion is denoted by reference numeral 144). Namely, the refractive index of the optical fibers is periodically varied. The period of the refractive index is gradually varied. When light enters the optical fibers, the light reflects to a different position corresponding to the wavelength thereof. In other words, the light is delayed corresponding to the wavelength. The delayed light is extracted by a circulator 145 and dispersed. When the light input direction is reversed against the fiber grating, dispersion characteristics with the reverse sign can be obtained.

FIG. 15B shows an example of a wave guide type dispersion equalizer.

A wave guide 146 is formed with quartz ($SiO_2$) on a Si substrate. A phase shifter 149 is disposed so that the phase of an upper wave guide 147 is different from the phase of a lower wave guide 148. The phase shifter 149 causes a long wavelength component of the input optical signal to propagate on the lower side and a short wavelength component thereof to propagate on the upper side. When the optical signal is propagated in such a wave guide a plurality of times, negative dispersion characteristics can be obtained. By adjusting the phase, dispersion characteristics with the reverse sign can be also obtained. An example of the phase shifter 149 can be a thin film heater.

FIG. 15C shows a resonator type dispersion equalizer.

A full reflection mirror 151 and a semi-transparent mirror 150 are disposed in such a manner that they face one another. When light enters from the semi-transparent mirror 150, a component with a wavelength corresponding to the distance between both the mirrors is multiply reflected therebetween. Thus, a resonance state takes place. In the vicinity of the resonance wavelength, the component that has been reflected a predetermined number of times proportional to the frequency is returned. When this component is extracted by the circulator, the light is delayed corresponding to the frequency (wavelength). Thus, the dispersion of light can be equalized. Depending on whether a higher region or a lower region than the resonance frequency is used, reverse dispersion characteristics can be obtained.

Thus, according to the present invention, since the transmitter does not always require a dispersion compensator, the optical transmission system can be structured at low cost.

In addition, when the RZ coded optical signal is used and the red-chirp is performed as a pre-chirp on the transmitter side, the transmission distance of the optical transmission system can be increased. Thus, the optical transmission system according to the present invention is very effective.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A dispersion compensator for use with an optical transmission system to compensate for dispersion of an optical signal propagated on a transmission line, comprising:
    a plurality of dispersion compensation units releasably connected together, each having the substantially the same dispersion compensation amount wherein each dispersion compensation unit has first and second sides, the first side having input and output terminals thereon and the second side having bypass terminals thereon, each dispersion compensation unit having a switch mechanism such that if the bypass terminals of a first dispersion compensation unit are connected to the input and output terminals of a second dispersion compensation unit, an optical path between the input and output terminals of the first dispersion compensation unit is opened and optical paths are closed in the first dispersion compensation unit between the input and output terminals and the bypass terminals, respectively.

2. The dispersion compensator as set forth in claim 1, further comprising a preparatory dispersion compensation device releasably connected to the dispersion compensation units, the preparatory dispersion compensating device having a dispersion compensation amount less than those of the dispersion compensating units.

3. The dispersion compensator as set forth in claim 1, wherein each dispersion compensation unit has a dispersion compensation fiber such that when the dispersion compensation units are connected together, the dispersion compensation fibers are connected in series.

* * * * *